United States Patent [19]
Hobson et al.

[11] 3,909,133
[45] Sept. 30, 1975

[54] ANALYSIS OF METALS

[75] Inventors: John Douglas Hobson; Teddie Ward Lomas, both of Sheffield, England

[73] Assignee: Dunford Hadfields Limited, England

[22] Filed: Aug. 22, 1973

[21] Appl. No.: 390,431

[52] U.S. Cl. .................. 356/86; 250/227; 250/341; 250/372
[51] Int. Cl.² .......................................... G01J 3/30
[58] Field of Search .................... 356/86; 250/227

[56] References Cited
UNITED STATES PATENTS

| | | | |
|---|---|---|---|
| 2,464,402 | 3/1949 | Kentis, Jr. | 250/227 X |
| 2,709,367 | 5/1955 | Bohnet | 250/227 X |
| 3,327,126 | 6/1967 | Shannon et al. | 250/227 X |
| 3,367,229 | 2/1968 | Berneron | 356/86 |
| 3,413,481 | 11/1968 | Berry | 356/86 X |
| 3,527,954 | 9/1970 | Hoffman | 250/227 |
| 3,645,628 | 2/1972 | Bojic et al. | 356/86 |
| 3,672,774 | 6/1972 | Bojic et al. | 356/86 |
| 3,692,415 | 9/1972 | Shiller | 250/227 X |

*Primary Examiner*—James W. Lawrence
*Assistant Examiner*—T. N. Grigsby
*Attorney, Agent, or Firm*—Molinare, Allegretti, Newitt & Witcoff

[57] ABSTRACT

An apparatus for analysing metals, which apparatus comprises a device for producing radiation by the excitation of the metal, and an optical fibre guide means for transmitting the radiation from the metal to an analytical instrument.

22 Claims, 2 Drawing Figures

ANALYSIS OF METALS

This invention relates to improvements in the analysis of metals such as, for example, iron and steel, copper and aluminium alloys.

In metal forming or using industries one frequently requires a quick analysis of a metal article. Thus, during manufacture of metal articles, it is most important that the chemical composition of metal shall be known at all stages of manufacture so as to ensure correct heat-treatment and the attainment of proper mechanical properties. When many varieties of alloy are being manufactured it is also very important to avoid the mixing of different types and, in these circumstances, an analysis to check composition may be made on each individual piece before despatch from the manufacturer's plant. Also, in metallurgical industries the composition of scrap metal and production off-cuts and discards must be known before they can be used as a source of raw material for the manufacturing process. Similar requirements arise in metal-using industries, for example, engineering, where many types of metal or alloy are used for components and their identification must be checked.

The analyses are usually required to be performed rapidly and in considerable numbers so that action can be based on the results obtained. Conventional chemical methods are too slow, whereas analyses made by instruments based on physical methods, for example x-ray fluoroscence, or the excitation of visible or ultraviolet light in combination with a suitable spectroscope, spectrometer or spectrograph, require laboratory conditions. These physical methods usually require the detachment of a small specimen of the metal weighing not more than a few ounces and the production of a carefully prepared surface having a standarised finish. The instruments themselves are not constructed to bear, on their input attachments, the weight of large masses of metal commonly found in industry as product or scrap, and usually they have severe limitations of sample dimensions. Furthermore, the sample must be in an accurately fixed location with respect to the instrument input when it is excited by the application of an electrical discharge or plasma.

There has, therefore, been no really satisfactory way of obtaining a quick and accurate analysis of metal articles in the workshop. Accordingly, the invention has been made with this in mind.

According to the invention, there is provided an apparatus for analysing metals, which apparatus comprises a device for producing radiation by excitation of the metal and an optical fibre guide means for transmitting the radiation from the metal to an analytical instrument.

Also according to the invention, there is provided a method of analysing metals wherein radiation produced by exciting of the metal is transmitted to an analytical instrument by way of an optical fibre guide.

According to the invention the analytical instrument is housed under ideal laboratory conditions while the metal under test is excited in the workshop or in whatever other position it happens to be, the ultra-violet, visible or infra-red radiation produced by the excitation being transmitted to the analytical instrument by means of an optical fibre guide.

By following the invention, the analytical instrument can produce accurate results while the sample can be positioned on the shop floor or at a location between two manufacturing steps.

The optical fibre guide can consist of a bundle of fibres, such as of glass, quartz or a synthetic polymer, which channel the visible infra-red or ultraviolet radiation along themselves by total internal reflection. The guides may be made flexible, and may therefore transmit the radiation around obstructions, from moving objects, and from inaccessible positions, to a fixed point of reception adjacent to the analytical instrument. A suitable choice of light guide and supplementary lenses may allow more light to be gathered than by a simple optical fibre guide with the result that the instrument can produce results more rapidly.

A portable, fixed or moving excitation source may be coupled to the inlet of the optical fibre guide so as to excite a metal sample so that the guide can convey the resulting radiation to the analytical instrument.

The analytical instrument can be housed under controlled environmental conditions, for example in an enclosure kept free from dust and/or vibration and, if desired, at a constant temperature and/or humidity. This housing can be near the point of excitation, but kept under controlled conditions.

The excitation of the sample can take place under workshop conditions where facilities can be provided for the transport of large masses of metal, for example by fork lift truck, overhead crane, conveyor belt, roller table, or hydraulic manipulator. The excitation point may also be included in an inspection or production line, for example after examination for cracks and other physical defects. By this means the automation of repetitive examination is greatly facilitated, and the quick and accurate analysis of metal of irregular shape, for example scrap, is made possible.

In the examination of steel articles, one normally has to clean a part of the metal surface to free it of scale and roughness by grinding before the metal is examined, and this cleaning operation provides a metal surface which is either then, or after a further local preparative process, suitable for excitation for analysis.

The results obtained from the analytical instrument can be used in a number of ways. For example, the results can be used to indicate by a visual or audible signal when a particular piece of metal is to be rejected and can be made to operate a device to reject the unsatisfactory specimen from the production line. Moreover, the instrument may cause the analytical information to be recorded together with information identifying the material, for example cast number, alloy type, or order number, simultaneously on paper by producing a printed or punched record, or by storing the information magnetically on disc, tape or film, which may subsequently form the input data for a computer. Further the analytical data from the instrument may be fed directly to a computer for processing.

The invention will now be illustrated, by way of example, and with reference to the accompanying drawings, in which.

Figure 1:
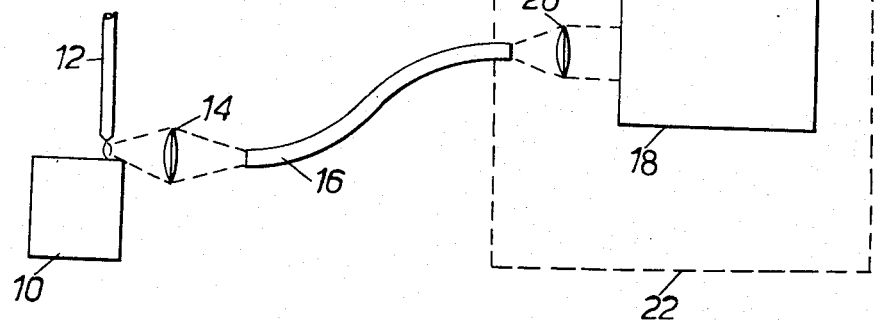
FIG. 1 is a diagram illustrating a preferred embodiment of the invention.

As best shown in FIG. 1, a small part of the surface of a specimen is excited by a discharge from suitable electrode 12 and some of the resulting ultra-violet radiation is focused by a lens 14 onto the end of an optical fibre guide 16 which is capable of transmitting the ultra-violet radiation. The radiation passes by way of total reflection in the fibres of the guide along the latter to a suitable analysing spectrometer 18. A collimating lens 20 converts the ultraviolet radiation from the guide into a parallel beam which the spectrometer 18 accepts.

Preferably the counter electrode 12, the focusing lens 14 and the end of the light guide 16 are aligned with respect to each other but movable as a unit to allow them to be brought into the correct position against the surface of the metal to be analysed.

The fibre guide 16 can be comparatively long and even flexible and therefore the spectrometer 18 can be housed under ideal laboratory conditions in a suitable housing 22. It can therefore give accurate results. The specimen 10, on the other hand, can be positioned in a convenient way under normal conditions existing at that point which would probably be completely unsuitable for the spectrometer 18. In addition, the specimen can be massive, larger, in fact, than could normally be supported by the spectrometer during an analysis, and a small accurate sample does not need to be cut from the specimen which might of course ruin the specimen.

Figure 2:
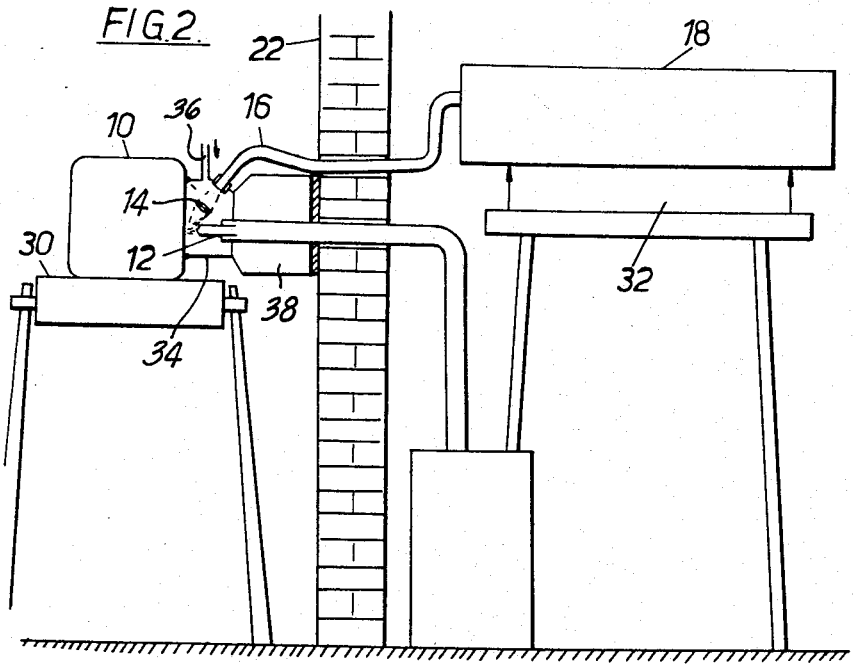
FIG. 2 is an elevation view of this preferred embodiment.

In FIG. 2 is shown the preferred arrangement. The specimen 10, which can, for example, be a billet or bar of steel, is carried along a conveyor 30 past the exciting electrode 12 and the guide 16. The specimen has had at least a part of its surface prepared by wave grinding for inspection for physical defects and is then carried by the conveyor for the testing according to the invention.

Preferably the specimen passes into a small enclosure (not shown) flushed with argon when aligned with the electrode 12, focussing lens 14, and guide 16. Argon is transparent in the far ultra-violet where the spectrum lines of carbon, phosphorous and sulphur are found, and it improves the characteristics of the discharge.

As an alternative, the electrode 12, lens 14 and end 16 of the guide are located in a hood or enclosure 34 which can be placed against the specimen, the placing of the hood against the specimen automatically locating the electrode with the appropriate gap (i.e., normally 5 mm) for the electrical discharge as well as correctly aligning the focussing lens 14 and fibre optic 16. Of course the hood would include means, shown generally as 38 in FIG. 2, to be moved toward and away from the specimen to be analysed so that the hood, electrode 12 and optical fibre 16 may allow it to be brought into the appropriate position. Further, the rim of the hood will usually be such as to provide a rough seal on the ground surface of the specimen to seal out air and seal in argon which may be admitted to hood 34 by way of conduit 36. The specific structural details on the means 38 for moving the hood 34 are not shown, since any number of mechanisms are available and may be selected by one skilled in the art.

The excitation is preferably of high intensity, for example by the use of a high-repetition frequency source unit, in order to minimise the time needed to integrate the instrumental measurement.

The ultra-violet radiation emitted by the excited specimen is taken by the guide through this wall of the housing 22 to the spectrometer 18 which, as can be seen, is rigidly supported on antivibration mountings 32.

The spectrometer 18 makes a rapid analysis for essential constituents, including, for example, one or more of the elements carbon, manganese, nickel, chromium, molybdenum and aluminium according to the steel type under inspection. The analytical output of the spectrometer 18 is transmitted to a small computer (not shown) which causes analysis and sample identification to be printed on paper, and simultaneously sends actuating signals to a device (not shown) which puts an identification code on the steel bar of billet, together with marks indicating acceptability of composition.

As can be seen, this arrangement is simple and inexpensive to install and can readily be applied as a step in any metal manufacturing or treating process. Even so, because the spectrometer is housed under carefully controlled conditions, accurate results can still be obtained.

What we claim is:

1. Apparatus for analysing metals, comprising
sample positioning means for positioning the metal to be analysed in a predetermined location,
radiation means for producing radiation by excitation of the metals to be analysed,
analytical instrument means for analysing said radiation,
optical fibre guide means for transmitting the radiation from the metal to said analytical instrument means, and
movable mounting means movable toward and away from said predetermined location of the metal being analysed, said radiation means and the end of said optical fibre guide means being mounted to said movable mounting means for simultaneous movement together therewith to position the last two mentioned means into a position adjacent said predetermined location of the metal being analysed and in predetermined relationship to each other and to the metal being analysed.

2. The apparatus of claim 1 wherein said radiation means comprises a high repetition frequency source of excitation.

3. The apparatus of claim 1 wherein said radiation is ultra-violet radiation.

4. The apparatus of claim 1 wherein said radiation is visible radiation.

5. The apparatus of claim 1 wherein said radiation is infrared radiation.

6. The apparatus of claim 1 wherein said radiation means comprises an electric discharge which excites the metal.

7. The apparatus of claim 1 wherein said radiation means comprises an electrode positioned to produce an arc between said electrode and the metal.

8. The apparatus of claim 1 wherein said radiation means excites said metal with a plasma.

9. The apparatus of claim 1 wherein said optical fibre guide means comprises a bundle of fibres of a material which channels the radiation along themselves by total internal reflection.

10. The apparatus of claim 1 wherein said optical fibre guide means is flexible.

11. The apparatus of claim 1 wherein said radiation means is positioned adjacent the inlet of said optical fibre guide means.

12. The apparatus of claim 1 including lens means for collecting and directing said radiation to said optical fibre guide means.

13. The apparatus of claim 12 wherein said movable mounting means mounts said radiation means, said lens means and the end of said optical fibre guide means adjacent the metal for movement together to bring the last three mentioned means into a position against the metal to be analysed.

14. The apparatus of claim 1 including means for maintaining said analytical instrument means under controlled environmental conditions.

15. The apparatus of claim 1 including signal means for producing a sensible signal when the metal analysed does not meet a predetermined standard.

16. The apparatus of claim 1 including recording means for recording analytical information and information identifying the metal being analysed.

17. The apparatus of claim 1 including collimating lens means which converts radiation from the optical fibre guide means into a parallel beam.

18. The apparatus of claim 1 including enclosure means enclosing the portion of the metal which is being analysed, and inlet means for introducing an inert gas into said enclosure means to flush said enclosure.

19. The apparatus of claim 18 wherein said inert gas is argon.

20. The apparatus of claim 1 wherein said analytical instrument means is a spectrometer.

21. A method of analysing solid ferrous, copper and aluminum metals and alloys thereof, comprising, positioning the metal to be analysed in a predetermined location, mounting radiation producing means and an optical fibre guide in predetermined relationship to each other, simultaneously moving said mounted radiation producing means and optical fibre guide together toward and away from said predetermined location of the metal being analysed, exciting the metal being analysed by said radiation producing means to produce radiation emanating from the metal when said radiation producing means is moved toward and is adjacent said predetermined location of the metal being analysed, transmitting said radiation through said optical fibre guide to a location remote from the metal being analysed, and analysing the transmitted radiation at said remote location.

22. The apparatus of claim 18 wherein said enclosure means comprises said movable mounting means.

* * * * *